(12) United States Patent
Justl

(10) Patent No.: US 10,539,239 B2
(45) Date of Patent: Jan. 21, 2020

(54) DOUBLE SEAT VALVE FOR ASEPTIC LINES FOR PRODUCT

(71) Applicant: EVOGUARD GMBH, Nittenau (DE)

(72) Inventor: Johann Justl, Sinzing (DE)

(73) Assignee: Evoguard GmbH, Nittenau (DE)

( * ) Notice: Subject to any disclaimer, the term of this patent is extended or adjusted under 35 U.S.C. 154(b) by 0 days.

(21) Appl. No.: 16/009,624

(22) Filed: Jun. 15, 2018

(65) Prior Publication Data
US 2019/0032790 A1    Jan. 31, 2019

(30) Foreign Application Priority Data
Jul. 31, 2017 (DE) .................. 10 2017 213 153

(51) Int. Cl.
*F16K 1/44* (2006.01)
(52) U.S. Cl.
CPC .............. *F16K 1/443* (2013.01); *F16K 1/446* (2013.01); *Y10T 137/88038* (2015.04)
(58) Field of Classification Search
CPC ... F16K 1/443; F16K 1/446; Y10T 137/88038
USPC ................. 137/614.16–614.18, 240
See application file for complete search history.

(56) References Cited

U.S. PATENT DOCUMENTS

| 8,528,584 B2* | 9/2013 | Wiedenmann et al. ................... |
| | | F16K 31/122 |
| | | 137/240 |
| 8,622,076 B2* | 1/2014 | Burnnester et al. .... F16K 1/446 |
| | | 137/240 |
| 9,416,879 B2 | 8/2016 | Fath et al. |

FOREIGN PATENT DOCUMENTS

DE    102006025653 A1    9/2007

* cited by examiner

*Primary Examiner* — Kevin L Lee
(74) *Attorney, Agent, or Firm* — McCoy Russell LLP

(57) ABSTRACT

A double seat valve for aseptic lines for product is described, the valve comprising a valve housing, two line ports arranged on the valve housing for connecting the aseptic lines for product to the valve housing, two valve seats that are formed between the line ports on the valve housing and confine a safety chamber formed therebetween for leaks against the line ports, a first closure element which is actuatable by way of a first valve stem and acts against one of the two valve seats, and with a second closure element which is actuatable by way of a second valve stem and acts against the other of the two valve seats. T first valve stem at least in part surrounds the second valve stem, so that both are movable independently along a valve axis. The first valve stem is connected to the second valve stem by way of a diaphragm seal formed in a ring-shaped manner around the valve axis A for sealing against the safety chamber, characterized in that an outer fastening portion of the annular diaphragm seal is bent inwardly toward the valve axis by a bending angle of more than 90°, so that it abuts against on a tapered surface of a first fastening element.

19 Claims, 3 Drawing Sheets

DOUBLE SEAT VALVE FOR ASEPTIC LINES FOR PRODUCT

CROSS-REFERENCE TO RELATED APPLICATION

This application claims priority to German Application No. 10 2017 213 153.5 entitled "DOUBLE SEAT VALVE FOR ASEPTIC LINES FOR PRODUCT," filed on Jul. 31, 2017, the entire content of which is incorporated here in reference in its entirety for all purposes.

TECHNICAL FIELD

The invention relates to a double seat valve for aseptic lines for a product, a method for assembling a double seat valve for the product, and a beverage treatment and/or filling system with at least one double seat valve.

BACKGROUND AND SUMMARY

Double seat valves are typically used when transporting particularly sensitive products in the field of food production, for example, for the aseptic filling of liquid or viscous products into containers. Such double seat valves commonly have two valve seats formed between the line ports on the valve housing, against which two closure elements act that can be actuated independently of one another by way of valve stems. A safety chamber for leaks is thus formed between the valve seats, which reduces unintentional overflow of the product from one line port into the other line port, for example in the case of pressure surges.

In aseptic applications, a hermetic seal of the regions of the double seat valve, through which the product flows, is required against the other mechanics with the valve stems and the drives. It is known to use a diaphragm seal having a ring shape for sealing purposes, since, inter alia, the two closure elements move against one another during actuation.

Examples of such aseptic double seat valves with a diaphragm between the two closure bodies are shown, for example, in EP 2 734 757 B1 and DE 10 2006 025 653 C5.

However, a disadvantage with such aseptic double seat valves is that the diaphragm requires complex assembly elements for attachment between the two closure bodies. In addition, contact points with microscopic gaps form between the individual assembly elements and must be sealed against the product, so that no contaminants can accumulate therein.

In one example, improvements in the known double seat valves in terms of the attachment of the diaphragm and the formation of contact points may be provided by a double valve seat comprising a valve housing; two line ports arranged on said valve housing for connecting aseptic lines for product to said valve housing; two valve seats formed between the two line ports on said valve housing, the two valve seats defining a safety chamber formed there-between for leaks against the two line ports; a first closure element, actuatable by a first valve stem, acting against one of the two valve seats; and a second closure element, actuatable by a second valve stem, acting against another of the two valve seats, wherein said first valve stem surrounds said second valve stem, at least in sections, so that both are movable independently along a valve axis, and wherein said first valve stem is connected via a diaphragm seal, which is formed to have a ring shape around said valve axis, to said second valve stem for sealing against said safety chamber, and wherein an outer fastening portion of said diaphragm seal is bent inwardly toward said valve axis by a bending angle of more than 90°, so that it abuts against a tapered surface of a first fastening element.

By bending the outer fastening portion by more than 90°, the first fastening element can be arranged radially inside the outer fastening portion of the diaphragm seal, which makes contact points of the first fastening element facing the product space unnecessary. Consequently, the double seat valve according to the invention is improved in terms of the formation of contact points.

By having the outer fastening portion of the ring-shaped diaphragm seal be bent inwardly toward the valve axis by an angle of more than 90°, so that the former abuts the tapered surface of the first fastening element, the first fastening element can be inserted during assembly first into the diaphragm seal so that both can be mounted as a unit. This unit can subsequently be attached between the two closure elements in a particularly simple manner.

The double seat valve can be arranged in a beverage treatment and/or filling system to connect the aseptic lines for product with one another. The double seat valve can preferably be associated with a filler for filling a product into containers. The aseptic lines for product can be intended to carry a particularly delicate product such as a dairy product after sterilization. The dairy product can be, in particular, UHT milk, yoghurt and the like. The particularly sensitive product can also be, for example, still mineral water.

The double seat valve can comprise a product chamber, the outer wall of which is formed by a first spherical or tubular section of the valve housing. Furthermore, the first closure element and the associated valve seat can form a transition between the product chamber and the safety chamber. It is conceivable that the first closure element comprises a first valve disk and a connection shaft, where the connection shaft encloses the first valve stem in the region of the product chamber. The connection shaft can preferably be integrally formed with the first valve disk. The connection shaft can be connected to the first valve stem and/or the first valve disk can interact with the first valve seat. The first valve stem can preferably comprise a shoulder, where the first closure element can be clamped in between the shoulder and the first closure element. The end of the connection shaft disposed opposite the first valve disk can be sealed against the valve housing by way of a ring-shaped diaphragm.

The safety chamber can be formed as a second spherical or tubular section of the valve housing which adjoins the product chamber via the valve seat associated with the first closure element. The one end of the safety chamber can be formed by the first closure element and the other end of the safety chamber can be formed by the second closure element. The product chamber can preferably be arranged vertically above the safety chamber during operation. Accordingly, the first closure element can be arranged vertically above the second closure element during operation. "Vertical" can mean the direction pointing towards the center of the earth. The one of the two line ports can preferably be connected directly to the product chamber and the other of the two line ports to the safety chamber only via the second closure element.

The second closure element can comprise an intermediate shaft and a second valve disk. The intermediate shaft can preferably be integrally formed with the second valve disk. The intermediate shaft can be connected to the second valve stem and/or the second valve disk can interact with the second valve seat.

The first and the second closure elements can preferably be formed around the valve axis in a rotationally symmetrical manner and/or on the first and second valve disk comprise outer sealing rims which act against the two valve seats. The two valve seats can preferably extend in an annular shape around the valve axis.

The first and second valve stems can each be connected to a drive to actuate the first and the second closure elements, respectively. Such a drive can be, for example, a pneumatic linear drive. The first and/or the second valve stem can be integrally formed. However, a multi-part configuration is also conceivable.

The diaphragm seal having a ring shape can presently mean that the diaphragm seal has a rotationally symmetrical shape which is, in particular, plate-shaped. In addition, this can mean that the diaphragm seal, for connecting the second closure element to the second valve stem, has a circular opening which is formed in the former's center, preferably in the region of the valve axis. The "outer fastening portion of the ring-shaped diaphragm seal being bent inwardly toward the valve axis by an angle of more than 90°" can presently mean that the outer fastening portion is permanently deformed like this by a deformation process and/or by clamping with the first fastening element. In other words, the outer fastening portion of the ring-shaped diaphragm seal in the assembled state can be bent with the first fastening element by a bending angle of more than 90°. Preferably, the outer fastening portion of the ring-shaped diaphragm seal can be permanently bent in such a way that it forms a tapered surface which tapers conically inwardly from a bending line to the valve axis. The bending angle can be determined, for example, by determining the angle of the outer fastening portion, preferably in the assembled state, relative to a plane which runs perpendicular to the valve axis and/or parallel to an outermost circular rim of the ring-shaped diaphragm seal.

The ring-shaped diaphragm seal can be connected via the outer fastening portion directly to the first valve disk of the first closure element and/or connected on an inner fastening portion directly to the connection shaft of the second closure element.

The ring-shaped diaphragm seal can preferably comprise at least two interconnected layers of expanded PTFE plastic material (also known as Teflon), the fibers of which are oriented in different directions relative to each other, the different directions preferably being perpendicular to each other. As a result, the ring-shaped diaphragm seal is configured to be particularly robust for a long service life. The two interconnected layers can be formed like a film. The two layers can preferably be bonded together by adhesive or bonding plastic material. The fibers in the material typically form in the direction in which the PTFE plastic material is stretched. With a bending line in the direction of the fibers, the layers made of expanded PTFE plastic material can exhibit higher stiffness than with another bending line transverse to the fibers. Due to the directions of the fibers of the two layers being in different directions relative to each other, preferably perpendicular, the composite has more uniform stiffness than the individual layers.

With the deformation process, the fastening portion of the ring-shaped diaphragm seal can be permanently bent by a deformation angle such that the deformation angle in an uninstalled state, i.e. without further support or clamping elements, is in a range of 91°-135°, preferably in a range of 95°-120°. As a result, a spring force of the outer fastening portion of the diaphragm seal acts inwardly against the tapered surface of the first fastening element and the ring-shaped diaphragm seal can be clipped onto the first fastening element during assembly and can be fixed particularly securely. The deformation process can be, for example, a thermal forming process in which at least the outer fastening portion is heated, reshaped and then cooled. For example, a circular disk-shaped blank can be heated at least at an outer edge portion which is then bent over as the outer fastening portion. Bending can be performed, for example, using a mold.

The outer fastening portion can be bent by the bending angle of more than 91°, preferably of more than 95°, more preferably of more than 100°. This results in a better grip of the ring-shaped diaphragm seal on the tapered surface of the first fastening element. The outer fastening portion can be folded preferably by a bending angle in a range from 91° to 135°, preferably in a range from 95° to 120°. As a result, the first fastening element can be inserted particularly easily in the ring-shaped diaphragm seal for assembly.

The ring-shaped diaphragm seal can be arranged on a plate-shaped side of the first closure element which forms a wall section of the safety chamber. As a result, the ring-shaped diaphragm seal is arranged on a vertically upper side of the safety chamber during operation, so that product adhering thereto drains particularly easily due to gravity. The plate-shaped side of the first closure element can preferably be provided to form a vertically upper side of the safety chamber during operation. In other words, the plate-shaped side of the first closure element can be arranged on an underside of the first valve disk during operation. The first closure element, preferably the first valve disk, can preferably comprise a depression into which the first fastening element and/or the ring-shaped diaphragm seal are insertable, at least in part.

The first closure element can comprise a mating surface for the tapered surface of the first fastening element to clamp the outer fastening portion between the first fastening element and the first closure element, where the tapered surface and the mating surface preferably form an outwardly tapered clamping gap to secure the outer fastening portion of the ring-shaped diaphragm seal from slipping out of the clamping gap. As a result, the ring-shaped diaphragm seal can be clamped in particularly securely toward the first closure element. The tapered surface and the mating surface can have different cone angles to form the outwardly tapered clamping gap.

The tapered surface of the first fastening element and/or the mating surface of the first closure element can have a corrugation or increased surface roughness in order to prevent the outer fastening portion of the ring-shaped diaphragm seal from slipping out of place. As a result, the ring-shaped diaphragm seal can be fixed particularly securely between the tapered surface and the mating surface. "Increased surface roughness" can presently mean an average roughness Ra in a range of 10-15 μm and/or an average roughness depth Rz in a range of 40-60 μm.

The first fastening element and the first valve stem can be connected to one another by way of a first screw thread such that the outer fastening portion of the ring-shaped diaphragm seal can be clamped in between the first fastening element and the first closure element when screwed together. As a result, the first fastening element and the ring-shaped diaphragm seal can be attached in a particularly simple manner. Preferably, the first valve stem can comprise a clamping surface configured as a shoulder, where the first closure element can be clamped in by screwing the first screw thread between the first fastening element and the clamping surface.

The first fastening element and the first closure element can be formed having centering surfaces for centering the first fastening element on the first closure element. This ensures that the first fastening element is centered with respect to the first closure element during assembly, so that the outer fastening portion of the ring-shaped diaphragm seal is clamped in evenly. It is conceivable that the centering surfaces are formed to be cylindrical. The centering surfaces can preferably be fabricated as fitting surfaces.

The first fastening element and the first closure element can be formed with corresponding positive-fit contour regions in order to prevent the first fastening element from rotating against the first closure element. This ensures that the ring-shaped diaphragm seal does not distort during assembly while being clamped in when the first fastening element is twisted. For example, the positive-fit contour regions can be formed as interlocking hexagons.

On the second closure element in the region of the safety chamber, the intermediate shaft can be arranged to connect to the second valve stem, where the ring-shaped diaphragm seal comprises the inner fastening portion which is connected to the intermediate shaft by a second fastening element. The inner fastening portion of the ring-shaped diaphragm seal can then be connected in a particularly simple manner to the second closure element. The inner fastening portion can be an inner rim of the ring-shaped diaphragm seal that forms the circular opening for connecting the second closure member to the second valve stem. The second fastening element can have an extension that protrudes through the circular opening of the ring-shaped diaphragm seal to center the ring-shaped diaphragm seal.

At an end facing the first closure element, the intermediate shaft can preferably comprise a mating surface for a circular-disk-shaped surface of the second fastening element in order to clamp the inner fastening portion of the ring-shaped diaphragm seal between the second fastening element and the intermediate shaft. As a result, the intermediate shaft and the second fastening element can be manufactured in a particularly simple manner. The mating surface and the circular-disk-shaped surface of the second fastening element can preferably have a planar shape. "Circular-disk-shaped surface" can presently mean a surface which is substantially planar and defined by an inner circular rim and by an outer circular rim.

The second fastening element and the intermediate shaft can be connected to one another by way of a second screw thread in such a way that the inner fastening portion of the ring-shaped diaphragm seal is clamped between the second fastening element and the intermediate shaft when the second screw thread is screwed in. As a result, a particularly simple assembly of the ring-shaped diaphragm seal at the intermediate shaft of the second closure element is possible.

The second valve stem, the second fastening element and/or the intermediate shaft can be formed to have centering surfaces for centering the intermediate shaft and/or the second fastening element on the second valve stem. With this centering, a rotationally symmetrical arrangement of the ring-shaped diaphragm seal relative to the second valve stem is ensured. As a result, the ring-shaped diaphragm seal is deformed particularly evenly, so that excessive wear is prevented.

The ring-shaped diaphragm seal can comprise a disk-shaped diaphragm region, where the inner rim of the disk-shaped diaphragm region forms the inner fastening portion, where the outer fastening portion adjoins on the exterior of the disk-shaped diaphragm region, and where the outer fastening portion and the disk-shaped diaphragm region form an angle of less than 90°, preferably less than 89°, more preferably less than 85°, even more preferably less than 80°. As a result, a particularly simple configuration of the ring-shaped diaphragm seal is possible and stresses are introduced into the material as little as possible during the deformation. The outer fastening portion can preferably form an angle with the disk-shaped diaphragm region in a range of 45° to 89°, preferably in a range of 60°-85°. As a result, the first fastening element can be inserted in a particularly simple manner into the ring-shaped diaphragm seal without excessively loading the outer fastening portion. The angle formed by the outer fastening portion and the disk-shaped diaphragm region in an assembled state can be meant.

In addition, the invention in claim 16 provides a method for the assembly of the double seat valve according to one of the claims 1-15. In addition, the method can comprise mutatis mutandis the features described above individually or in any combination.

Having the first fastening element first be inserted into the ring-shaped diaphragm seal, so that the force-locked connection to the tapered surface of the first fastening element is effected by the spring force of the outer fastening portion, fixes the ring-shaped diaphragm seal to the first fastening element. Consequently, it is possible to subsequently connect both to the first closure element as a unit. Consequently, assembly is particularly simple and possible with few elements. Having the first fastening element be inserted in this manner radially within the outer fastening portion of the ring-shaped diaphragm seal avoids further outwardly directed contact points of the first fastening element to other assembly elements. Consequently, the method according to the invention for the assembly of the double seat valve is also improved in terms of the formation of contact points.

In other words, the ring-shaped diaphragm seal can be clipped through the outer fastening portion, which is bent over by more than 90°, onto the first fastening element and mounted in the double seat valve as a preassembled unit. It is also conceivable that first the second fastening element and subsequently the first fastening element are inserted into the ring-shaped diaphragm seal. As a result, the first and the second fastening element and the diaphragm seal are mounted in the double seat valve as a preassembled unit.

In addition, the invention in claim 17 provides a beverage treatment and/or filling system with at least one double seat valve according to one of the claims 1-15. In addition, the beverage treatment and/or filling system and/or the double seat valve can comprise the features described above individually or in any combination desired.

The beverage treatment and/or filling system can comprise a filler for filling containers with a product which is passed through the double seat valve in the aseptic lines for product. It is conceivable that the beverage treatment and/or filling system comprises a pasteurizer for heat-treatment of product which is connected to the filler by way of the aseptic lines for product and the double seat valve. The filler can preferably comprise a carousel for transporting the containers on which several filling members are arranged for filling the product into the container during transport.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Further features and advantages of the invention shall be explained in more detail below with reference to the embodiments illustrated in the figures.

DETAILED DESCRIPTION

Figure 1:
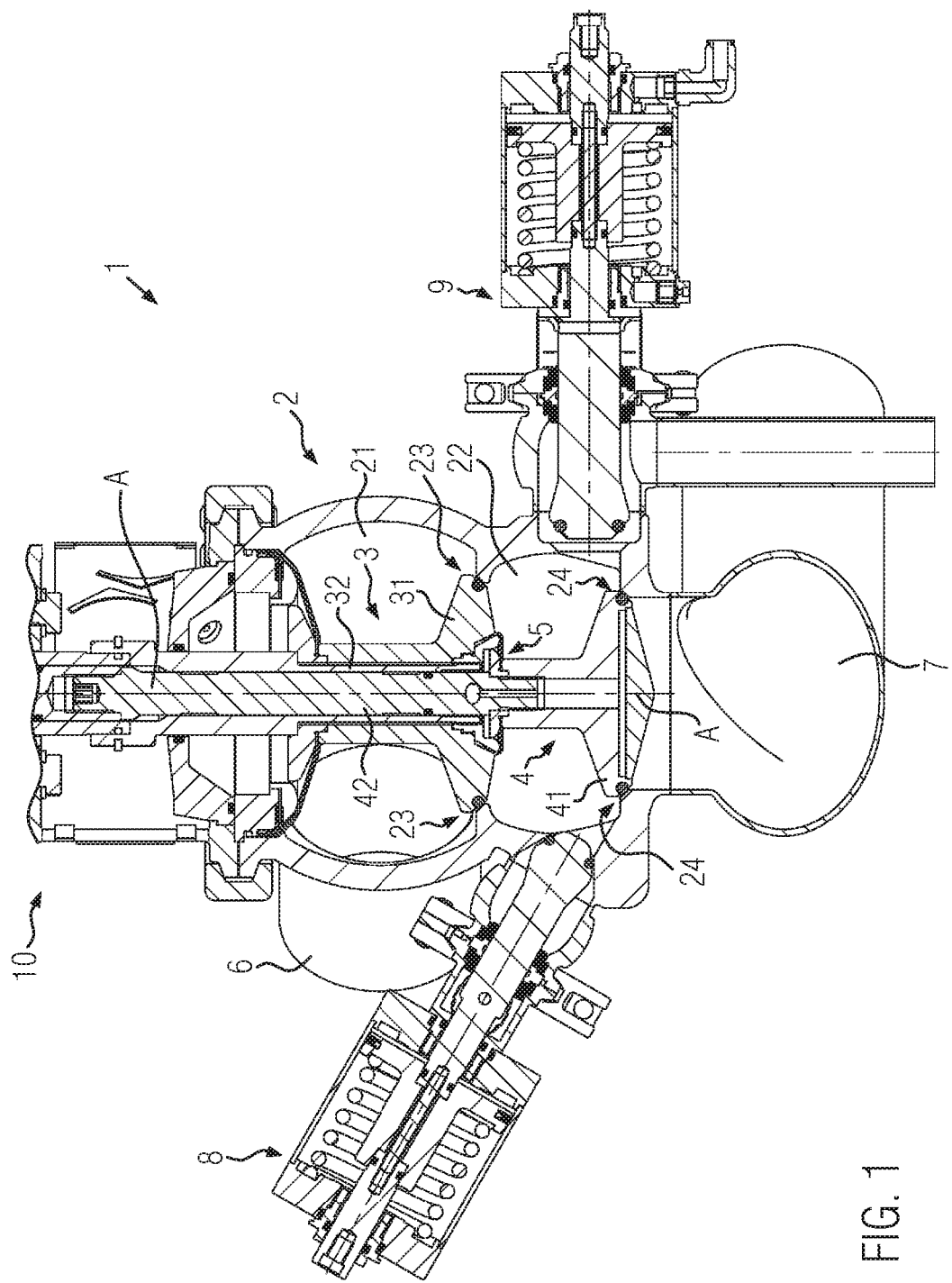
FIG. 1 shows a sectional view of an embodiment according to the invention of a double seat valve in a lateral view.

FIG. 1 shows a sectional view of an example embodiment of a double seat valve 1 in a lateral view. Double seat valve 1 comprises valve housing 2 with the two line ports 6, 7 for connecting the aseptic lines for product. In addition, formed between line ports 6 and 7 on valve housing 2 are two valve seats 23, 24 against which first closure element 3 and second closure element 4 act, respectively, and which are independently actuatable by way of valve stems 32 and 42. As a result, safety chamber 22 is formed between the two valve seats 22, 24 in valve housing 2 and confines the two line ports 6 and 7 against leaks.

It can also be seen that one of the two line ports 6 opens into product chamber 21 which is confined against safety chamber 22 by way of first closure element 3 and first valve seat 23. Furthermore, the other of the two line ports 7 to safety chamber 22 is confined by second closure element 4 and second valve seat 24. Both closure elements 3, 4 each comprise a valve disk 31 or 41, respectively, with a sealing element that is arranged circumferentially thereon and that is presently configured, for example, as an O-ring and acts directly against respective valve seat 23, 24. As a result, a particularly high sealing effect is obtained in the closed state.

First valve stem 32 surrounds second valve stem 42 in the region of product chamber 21, so that both can be moved independently of one another by drives in drive region 10 along valve axis A in order to actuate the two closure elements 3, 4. If both closure elements 3, 4 are in the closed state shown in FIG. 1, then the connection between line ports 6 and 7 is interrupted. If, on the other hand, both closure elements 3, 4 are moved upwardly by the two valve stems 32, 42, i.e. away from the two valve seats 22, 24, then a connection is established between the two line ports 6 and 7.

However, it is also conceivable that a sudden increase in pressure in the line for product connected to line port 7 arises in the closed state of the two closure elements 3, 4 shown in FIG. 1. As a result, second closure element 4 in rare cases is pushed away from second valve seat 24 so that leaks can flow into safety chamber 22. Media could also leak through defective seals into the leakage chamber. Safety chamber 22 then serves as a buffer, so that the leaks cannot reach product chamber 21. The leaks are discharged through open drain valve 9.

In order to subsequently clean safety chamber 22 and restore it to a sterile state, safety chamber 22 with cleaning valve 8 and drain valve 9 is rinsed by way of a cleaning agent and then sterilized by way of superheated steam. As a result, aseptic product treatment is again possible when subsequently actuating double seat valve 1.

Consequently, first valve stem 32 and second valve stem 42 are movable independently of each other, so that also the two closure elements 3, 4 can respectively move against each other. For sealing against safety chamber 22, they are therefore connected to each other by way of diaphragm seal 5 formed in a ring-shaped manner around valve axis A.

In order to ensure both high durability as well as a certain flexibility, ring-shaped diaphragm seal 5 is made of two interconnected layers of expanded PTFE plastic material, where the fibers of the two layers extend perpendicular to each other.

The exact configuration of the ring-shaped diaphragm seal 5 and its assembly in valve housing 2 are explained in more detail below with reference to FIGS. 2-3.

Figure 2:
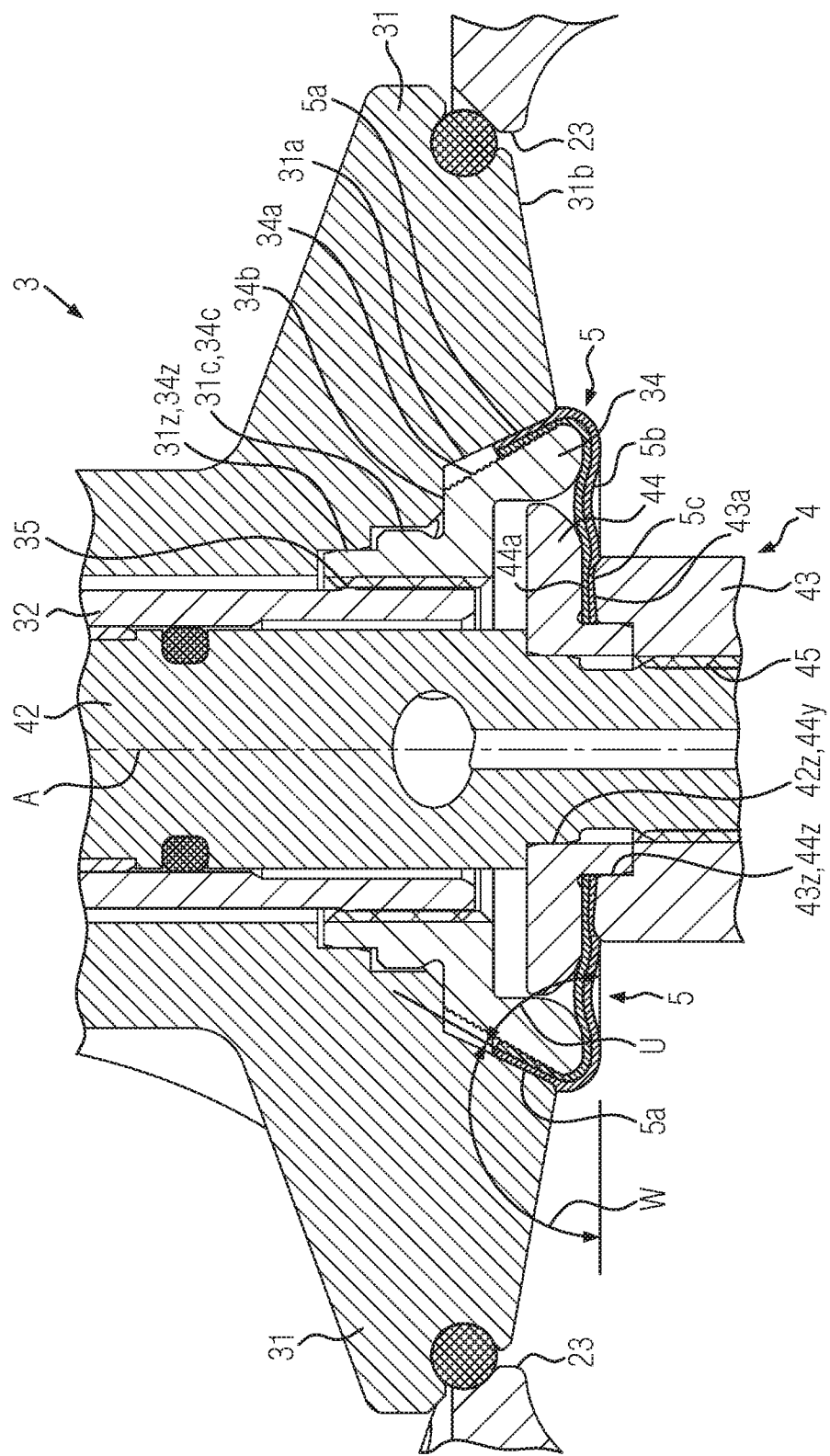
FIG. 2 shows a detail of the double seat valve from FIG. 1 in the region of the ring-shaped diaphragm seal as a lateral sectional view.

FIG. 2 shows a detail of double seat valve 1 from FIG. 1 in the region of ring-shaped diaphragm seal 5 as a lateral sectional view. It can be seen that ring-shaped diaphragm seal 5 comprises disk-shaped diaphragm region 5b, outer fastening portion 5a, and inner fastening portion 5c, where outer fastening portion 5a adjoins disk-shaped diaphragm region 5b on the outside and inner fastening portion 5c on the inside. In addition, it can be seen that outer fastening portion 5a is bent inwardly toward valve axis A by bending angle W of more than 90°, in this example by approximately 120°, so that it abuts against tapered surface 34 a of first fastening element 34. Outer fastening portion 5a of ring-shaped diaphragm seal 5 is bent inwardly, for example, in a thermal deformation process, by a deformation angle of 100° in such a way that it permanently maintains its shape in the region of the outer fastening portion, i.e. even without any clamping action by first fastening element 34. By mounting to first fastening element 34, outer fastening portion 5a of ring-shaped diaphragm seal 5 is further bent and clamped in, so that it obtains the bending angle W of about 120°. It is conceivable that bending angle W is in a range of 91°-135°, preferably in a range of 100°-130°. As a result, outer fastening portion 5, firstly, securely abuts against tapered surface 34a of first fastening element 34, and, secondly, first fastening element 34 can be inserted into ring-shaped diaphragm seal 5 during assembly without bending outer fastening portion 5a too much.

Conversely, in this example, outer fastening portion 5a and disk-shaped diaphragm region 5b form angle U of approximately 60°. Angle U is therefore in a range of 45°-89°, preferably in a range of 60°-85°.

Moreover, it can be seen that first closure element 3 comprises mating surface 31a for tapered surface 34a of first fastening element 34 for clamping outer fastening portion 5a between first fastening element 34 and first closure element 3. It can also be seen that tapered surface 34a and mating surface 31a have different angles to form an outwardly tapered clamping gap. As a result, outer fastening portion 5a of ring-shaped diaphragm seal 5 is prevented from slipping out of the clamping gap.

It can also be seen that tapered surface 34a of first fastening element 34 has a corrugation in order to secure outer fastening portion 5a of ring-shaped diaphragm seal 5 from slipping out of place. The corrugation is created, for example, by an advance motion during rotation of first fastening element 34. Alternatively, it is also conceivable that increased surface roughness is present in the region of tapered surface 34a.

Furthermore, first fastening element 34 and first valve stem 32 are connected to one another by way of first screw thread 35. When first valve stem 32 is screwed in, first fastening element 34 is then drawn against mating surface 31a of first closure element 3, so that outer fastening portion 5a of ring-shaped diaphragm seal 5 is clamped between first fastening element 34 and first closure element 3. As a result, ring-shaped diaphragm seal 5 can be connected in a particularly simple and secure manner to first closure element 3.

Furthermore, it can be seen that first fastening element 34 comprises centering surface 34z and first closure element 3 centering surface 31z, with which first fastening element 34 is centered in first closure element 3 when screwed to first screw thread 35. This results in particularly accurate and even clamping of ring-shaped diaphragm seal 5.

Furthermore, located between centering surfaces 31z, 34z and clamping surface 34b are corresponding positive-fit contour regions 31c, 34c with which first fastening element 34 and first closure element 3 are secured against rotation by a positive-fit contour, preferably an interlocking hexagon. This prevents rotation of fastening element 34 relative to ring-shaped diaphragm seal 5 during assembly.

Figure 3:
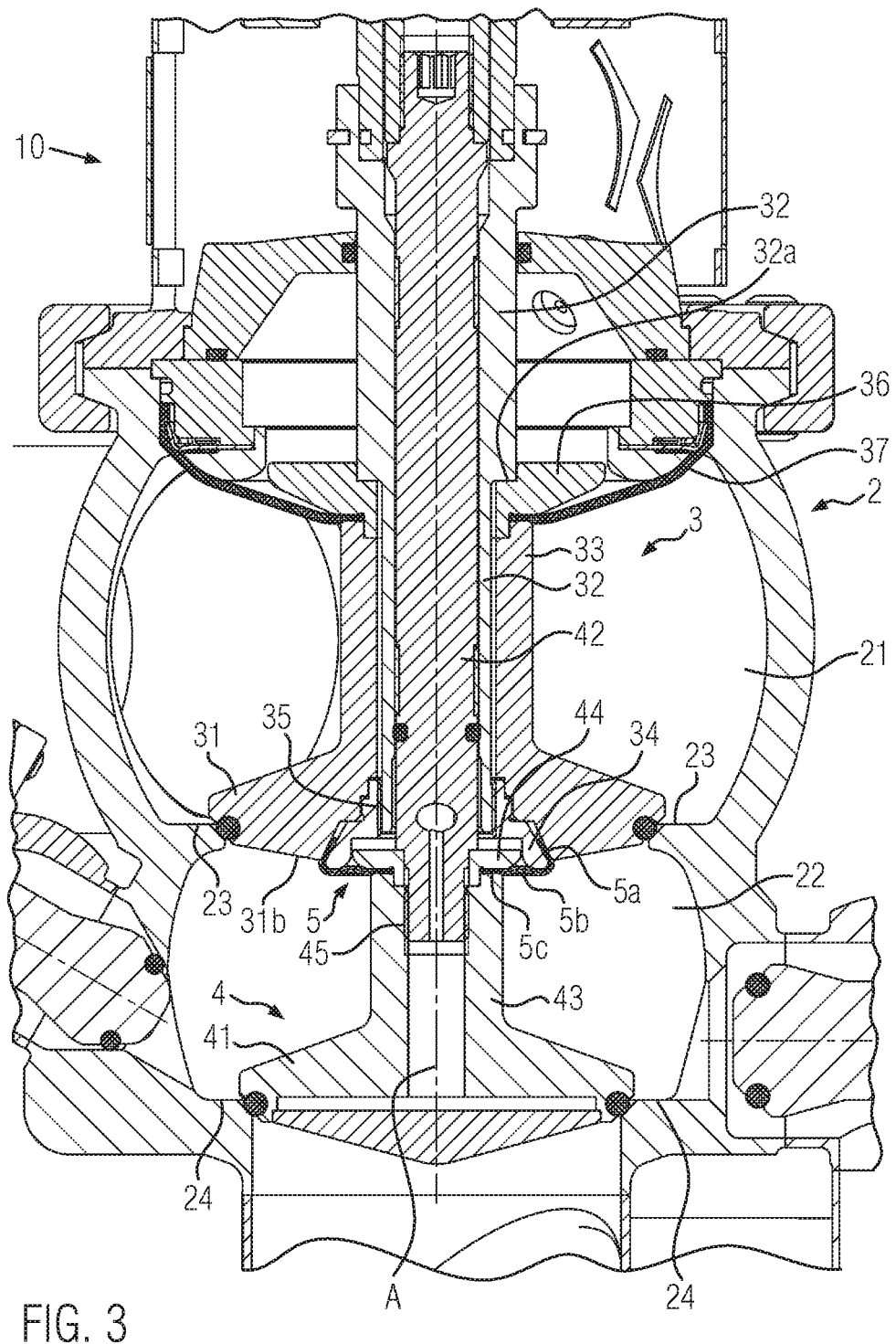
FIG. 3 shows a further detail of the double seat valve from FIG. 1 in the region of the valve housing as a lateral sectional view.

Furthermore, it can be seen in FIG. 2 that intermediate shaft 43 is arranged on second closure element 4 for connection to second valve stem 42 (see also FIGS. 1 and 3). Second fastening element 44 can also be clamped by way of second screw thread 45 between intermediate shaft 43 and second valve stem 42, so that inner fastening portion 5c of ring-shaped diaphragm seal 5 can be clamped in in this manner. For this purpose, second fastening element 44 comprises circular disk-shaped surface 44a and intermediate shaft 43 comprises mating surface 43a on the end facing first closure element 3. Inner fastening portion 5c is clamped between circular disk-shaped surface 44a and mating surface 43a by screwing second fastening element 4 to intermediate shaft 43. As a result, inner fastening portion 5c of ring-shaped diaphragm seal 5 can be embodied as being substantially planar and therefore be produced in a particularly simple manner.

Furthermore, it can be seen that second fastening element 44 comprises centering surfaces 44y, 44z, second valve stem 42 comprises centering surface 42z, and intermediate shaft 43 of first closure element 3 comprises centering surface 43z. In this manner, intermediate shaft can be centered on second valve stem 42 via second fastening element 44, so that valve disk 41 shown in FIG. 1 is exactly centered relative to second valve seat 24 or valve axis A, respectively. In addition, it is achieved that also inner fastening portion 5c of ring-shaped diaphragm seal 5 is clamped in an even manner.

In addition, it can be seen in FIG. 2 that ring-shaped diaphragm seal 5 is disposed on plate-shaped side 31b of first closure element 3, i.e. on the underside thereof. The latter forms a wall section of safety chamber 22 (FIG. 1), with which product residues adhering to ring-shaped diaphragm seal 5 can drain particularly easily by gravity. This is particularly advantageous for aseptic product treatment.

FIG. 3 shows a further detail of double seat valve 1 from FIG. 1 in the region of valve housing 2 as a lateral sectional view. The assembly of ring-shaped diaphragm seal 5 shall be explained in more detail with reference to FIG. 3.

First, second fastening element 44 is inserted into ring-shaped diaphragm seal 5 such that circular disk-shaped surface 44a comes into corresponding contact with inner fastening portion 5c. For easy and accurate assembly, second fastening element 44 has an extension which protrudes through the opening within inner fastening portion 5c. Furthermore, first fastening element 34 is inserted into ring-shaped diaphragm seal 5, so that the spring force of outer fastening portion 5a effects a force-locked connection to tapered surface 34a of first fastening element 34. As a result, ring-shaped diaphragm seal is secured to first fastening element 34 and second fastening element 44 is secured against dropping out. Consequently, ring-shaped diaphragm seal 5, first fastening element 34 and second fastening element 44 can now be inserted as a unit into valve disk 31 of first closure element 3.

First valve stem 32 is subsequently inserted through connection shaft 33 of first closure element 3 and screwed to second fastening element 34 by way of first screw thread 35. First valve stem 32 comprises a shoulder 32a which is supported against connection shaft 33 of first closure element 3. In the screwing process, first fastening element 34 is drawn against first closure element 3, whereby outer fastening portion 5a of ring-shaped diaphragm seal 5 is clamped in.

In addition, it can be seen in FIG. 3, without relevance for the invention, that shoulder 32a of first valve stem 32 is supported against connection shaft 33 by way of third fastening element 36 in such a way that the inner rim of upper diaphragm 37 is additionally clamped in, which seals product space 21 upwardly against drive region 10.

In addition, second connection shaft 42 is screwed by way of second screw thread 45 to intermediate shaft 43 of second closure element 4. As a result, inner fastening portion 5c is clamped and secured between second fastening element 44 and intermediate shaft 43.

When servicing, disassembly of ring-shaped diaphragm seal 5 is possible with correspondingly reverse steps.

It is therefore possible with double seat valve 1 according to the invention to install or remove ring-shaped diaphragm seal 5 with particularly few parts and in simple assembly steps. Due the first fastening element 34 and second fastening element 44 being arranged radially within outer fastening portion 5a of ring-shaped diaphragm seal 5, no further contact points or gaps to safety chamber 22 or product chamber 21 arise. Consequently, there are no further places with microscopic gaps in which product residues could accumulate or that need to be sealed.

It is understood that the features mentioned above in the embodiments described are not restricted to these feature combinations but are also possible individually or in any other combination.

The invention claimed is:
1. A double seat valve, comprising:
a valve housing;
two line ports arranged on said valve housing for connecting aseptic lines for product to said valve housing;
two valve seats formed between the two line ports on said valve housing, the two valve seats defining a safety chamber formed there-between for leaks against the two line ports;
a first closure element, actuatable by a first valve stem, acting against one of the two valve seats; and
a second closure element, actuatable by a second valve stem, acting against an other of the two valve seats, wherein said first valve stem surrounds said second valve stem, at least in sections, so that both are movable independently along a valve axis, and
wherein said first valve stem is connected via a diaphragm seal, which is formed to have a ring shape around said valve axis, to said second valve stem for sealing against said safety chamber, and wherein an outer fastening portion of said diaphragm seal is bent inwardly toward said valve axis by a bending angle of more than 90°, so that said outer fastening portion of said diaphragm seal abuts against a tapered surface of a first fastening element.

2. The double seat valve according to claim 1, wherein said outer fastening portion of said diaphragm seal is deformed in a deformation process by a deformation angle such that said deformation angle in an unassembled state is in a range of 91°-135°.

3. The double seat valve according to claim 1, where said outer fastening portion is bent by the bending angle by more than 91°.

4. The double seat valve of claim 1, wherein said diaphragm seal is arranged on a plate-shaped side of said first closure element which forms a wall section of said safety chamber.

5. The double seat valve of claim 1, wherein said first closure element comprises a mating surface for said tapered surface of said first fastening element to clamp said outer fastening portion between said first fastening element and said first closure element, where said tapered surface and said mating surface form an outwardly tapered clamping gap to secure said outer fastening portion of said diaphragm seal against slipping out of said clamping gap.

6. The double seat valve of claim 5, where one or more of said tapered surface of said first fastening element and said mating surface of said first closure element has a corrugation or increased surface roughness in order to prevent said outer fastening portion of said ring-shaped diaphragm seal from slipping out of place.

7. The double seat valve of claim 1, where said first fastening element and said first valve stem are connected to one another by way of a first screw thread such that said outer fastening portion of said ring-shaped diaphragm seal can be clamped in between said first fastening element and said first closure element when screwed together.

8. The double seat valve of claim 1, where said first fastening element and said first closure element are formed with centering surfaces for centering said first fastening element on said first closure element.

9. The double seat valve of claim 1, where said first fastening element and said first closure element are formed with corresponding positive-fit contour regions in order to prevent said first fastening element from rotating against said first closure element.

10. The double seat valve of claim 1, wherein an intermediate shaft is arranged on said second closure element in a region of said safety chamber to connect to said second valve stem, and wherein said ring-shaped diaphragm seal comprises an inner fastening portion which is connected to said intermediate shaft by a second fastening element.

11. The double seat valve of claim 10, wherein said intermediate shaft at an end facing said first closure element comprises a mating surface for a circular disk-shaped surface of said second fastening element in order to clamp said inner fastening portion of said ring-shaped diaphragm seal between said second fastening element and said intermediate shaft.

12. The double seat valve of claim 10, wherein said second fastening element and said intermediate shaft can be connected to one another by way of a second screw thread in such a way that said inner fastening portion of said ring-shaped diaphragm seal is clamped between said second fastening element and said intermediate shaft when said second screw thread is screwed in.

13. The double seat valve of claim 10, wherein one or more of said second valve stem, said second fastening element, and said intermediate shaft are formed with centering surfaces for centering said intermediate shaft and said second fastening element on said second valve stem.

14. The double seat valve of claim 10, wherein said ring-shaped diaphragm seal comprises a disk-shaped diaphragm region, where said inner rim of said disk-shaped diaphragm region forms an inner fastening portion, where said outer fastening portion adjoins on an outside of said disk-shaped membrane region, and where said outer fastening portion and said disk-shaped diaphragm region form an angle of less than 90°.

15. The double seat valve of claim 1, where said ring-shaped diaphragm seal comprises at least two interconnected layers of expanded PTFE plastic material, wherein fibers of said at least two interconnected layers of said expanded PTFE plastic material are oriented in different directions relative to each other, the different directions being perpendicular to each other.

16. The double seat valve of claim 1, wherein the valve is included in a beverage treatment or filling system.

17. A beverage treatment and/or filling system, comprising:
an aseptic line for product, the aseptic line including a double seat valve;
a filler for filling containers with the product upon passage through the double seat valve in the aseptic line; and
a pasteurizer for heat-treatment of the product, the pasteurizer connected to the filler via each of the aseptic line for product and the double seat valve, wherein the double seat valve comprises:
a valve housing with two line ports for connecting the valve housing to the aseptic line for product;
a safety chamber defined by two valve seats formed between the two line ports;
a first fastening element;
a first closure element, actuatable by a first valve stem acting against one of the two valve seats;
a second closure element, actuatable by a second valve stem acting against another of the two valve seats, the second valve stem at least partially surrounding the first valve stem, each of the first and second valve stems independently moveable along a common valve axis; and
a ring-shaped diaphragm seal concentric with the common valve axis, the diaphragm seal connecting the first valve stem to the second valve stem to seal against the safety chamber, wherein an outer fastening portion of the diaphragm seal is bent toward the common valve axis by a bending angle of more than 90° so that the outer fastening portion abuts against a tapered surface of the first fastening element.

18. The system of claim 17, wherein the filler further comprises a carousel for transporting the containers on which several filling members are arranged for filling the product into the container during transport.

19. The system of claim 17, wherein the bending angle is in a range of 91°-135°.

* * * * *